(12) United States Patent
Zhang et al.

(10) Patent No.: US 10,545,606 B2
(45) Date of Patent: Jan. 28, 2020

(54) SCANNING CIRCUIT FOR TOUCH SCREEN, TOUCH SCREEN AND TOUCH CONTROL METHOD

(71) Applicants: BOE TECHNOLOGY GROUP CO., LTD., Beijing (CN); Beijing BOE Display Technology Co., Ltd., Beijing (CN)

(72) Inventors: Kan Zhang, Beijing (CN); Bin Zhang, Beijing (CN); Qiang Zhang, Beijing (CN); Guangxing Wang, Beijing (CN); Dianzheng Dong, Beijing (CN); Pengming Chen, Beijing (CN)

(73) Assignees: BOE TECHNOLOGY GROUP CO., LTD., Beijing (CN); BEIJING BOE DISPLAY TECHNOLOGY GROUP CO., LTD., Beijing (CN)

( * ) Notice: Subject to any disclaimer, the term of this patent is extended or adjusted under 35 U.S.C. 154(b) by 7 days.

(21) Appl. No.: 15/736,397

(22) PCT Filed: May 5, 2017

(86) PCT No.: PCT/CN2017/083274
§ 371 (c)(1),
(2) Date: Dec. 14, 2017

(87) PCT Pub. No.: WO2018/000937
PCT Pub. Date: Jan. 4, 2018

(65) Prior Publication Data
US 2019/0095027 A1 Mar. 28, 2019

(30) Foreign Application Priority Data
Jun. 30, 2016 (CN) .......................... 2016 1 0509577

(51) Int. Cl.
*G06F 3/041* (2006.01)

(52) U.S. Cl.
CPC .................................. *G06F 3/0416* (2013.01)

(58) Field of Classification Search
CPC ............................... G06F 3/0416; G06F 3/041
See application file for complete search history.

(56) References Cited

U.S. PATENT DOCUMENTS

| 9,733,759 B2* | 8/2017 | Sun .......................... G06F 3/044 |
| 2011/0025644 A1* | 2/2011 | Lin ....................... G06F 3/0416 |
| | | 345/174 |

(Continued)

FOREIGN PATENT DOCUMENTS

| CN | 104505014 A | 4/2015 |
| CN | 104834427 A | 8/2015 |

(Continued)

OTHER PUBLICATIONS

Search Report for International Application No. PCT/CN2017/083274 dated Aug. 11, 2017.

*Primary Examiner* — Afroza Chowdhury
(74) *Attorney, Agent, or Firm* — Calfee, Halter & Griswold LLP

(57) ABSTRACT

The present disclosure discloses a scanning circuit for touch screen, touch screen and touch control method. The canning circuit for touch screen includes: a multiplexing circuit and a touch driving circuit coupled to the same, the touch driving circuit includes m signal input terminals, each of which is coupled to n receiving-electrode channels, and in an $i^{th}$ time slot of a current scanning period, the multiplexing circuit controls the touch driving circuit to receive, through the m signal input terminals, output signals from m receiving-electrode channels, and determines a touch position according to an emitting-electrode channel corresponding to the current scanning period and the output signals of the m receiving-electrode channels, the current scanning period includes n time slots, i=1, 2, . . . n, and the output signals of (Continued)

the m receiving-electrode channels received by the touch driving circuit in each time slot are different.

17 Claims, 5 Drawing Sheets

(56) References Cited

U.S. PATENT DOCUMENTS

| | | | |
|---|---|---|---|
| 2015/0022494 A1* | 1/2015 | Azumi | G06F 3/044 345/174 |
| 2016/0179276 A1* | 6/2016 | Nathan | G06F 3/0414 345/174 |
| 2016/0188091 A1 | 6/2016 | Sun et al. | |
| 2016/0320886 A1* | 11/2016 | Kim | G06F 3/0412 |
| 2017/0147127 A1 | 5/2017 | Sun | |
| 2017/0186773 A1 | 6/2017 | Fan et al. | |

FOREIGN PATENT DOCUMENTS

| | | |
|---|---|---|
| CN | 105244005 A | 1/2016 |
| CN | 106155414 A | 11/2016 |
| IN | 201624028401 A | 8/2016 |

* cited by examiner

SCANNING CIRCUIT FOR TOUCH SCREEN, TOUCH SCREEN AND TOUCH CONTROL METHOD

CROSS-REFERENCE TO RELATED APPLICATIONS

The present application is based upon International Application No. PCT/CN2017/083274, filed on May 5, 2017, which is based upon and claims priority to Chinese Patent Application No. 201610509577.4, filed on Jun. 30, 2016, the entire contents of which are incorporated herein by reference.

TECHNICAL FIELD

The present disclosure relates to the field of touch display, and more particularly to a scanning circuit for a touch screen, a touch screen and a touch control method.

BACKGROUND

A touch screen as an effective interactive mode has been widely used. The touch screen includes a touch panel including a plurality of rows of emitting-electrode channels and a plurality of columns of receiving-electrode channels, and a scanning circuit for touch screen. The scanning circuit for touch screen includes a touch driving circuit including a plurality of signal input terminals. The plurality of columns of receiving-electrode channels in the touch panel are each electrically connected to a signal input terminal in the touch driving circuit respectively.

The touch screen in operation scans a row of emitting-electrode channel when a scanning period starts, and inputs a voltage signal to the row of emitting-electrode channel in this scanning period. The touch driving circuit receives an output signal from each column of receiving-electrode channel, and determines the touch position of a user according to the row of emitting-electrode channel currently being scanned and the output signal from each column of receiving-electrode channel. For example, if the user touches the touch panel at a position in the row of emitting-electrode channel currently being scanned, the output signal from the column of receiving-electrode channel where the touch position is located may be delayed. The touch driving circuit receives the output signal from each column of receiving-electrode channel, find out the column of receiving-electrode channel corresponding to the delayed output signal, and then determines the position according to the column of receiving-electrode channel and the row of emitting-electrode channel.

In implementing the present disclosure, the inventor finds out that the prior art has at least the following disadvantages.

Since each column of receiving-electrode channel is electrically connected to one signal input terminal of the touch driving circuit, as more and more receiving-electrode channels are formed on the touch panel, more and more signal input terminals are included in the touch driving circuit. Therefore, it is increasingly difficult to form wirings in the touch screen, and the costs of production are getting higher.

SUMMARY

The embodiments of the present disclosure provide a scanning circuit for a touch screen, a touch screen and a touch control method.

In a first aspect, there is provided a scanning circuit for touch screen including: a multiplexing circuit and a touch driving circuit coupled to the multiplexing circuit. The touch driving circuit includes m signal input terminals, and each of the signal input terminals is coupled to n receiving-electrode channels in a touch panel of the touch screen, where both m and n are integers greater than or equal to 2. The multiplexing circuit is configured to, in an $i^{th}$ time slot of a current scanning period of the touch panel, control the touch driving circuit to receive, through the m signal input terminals, output signals from m receiving-electrode channels, and determine a touch position according to an emitting-electrode channel corresponding to the current scanning period and the output signals of the m receiving-electrode channels. The current scanning period includes n time slots, where i=1, 2, . . . n, and the output signals of the m receiving-electrode channels received by the touch driving circuit in each of the time slots are different.

In an embodiment, the scanning circuit for touch screen includes M transistors, wherein M=m*n, and the multiplexing circuit includes n signal output terminals. Each of the n signal output terminals is coupled to gates of m transistors, first terminals of the m transistors are coupled to the m signal input terminals respectively, and second terminals of the m transistors are coupled to the m receiving-electrode channels included in the touch panel respectively. The multiplexing circuit is configured to, in the $i^{th}$ time slot of the current scanning period, output a high-level signal from an $i^{th}$ signal output terminal, and output low-level signals from the remaining n−1 signal output terminals, so as to control the m transistors connected to the $i^{th}$ signal output terminal to be turned on; The touch driving circuit is configured to receive, in the $i^{th}$ time slot, the output signals of the m receiving-electrode channels respectively coupled to the m transistors which are turned on.

In an embodiment, the multiplexing circuit includes n multiplexing sub-circuits, each of which includes a signal output terminal coupled to the gates of the m transistors; and in the $i^{th}$ time slot of the current scanning period, an $i^{th}$ multiplexing sub-circuit in the multiplexing circuit outputs a high-level signal, and the remaining n−1 multiplexing sub-circuits output low-level signals.

In an embodiment, each of the multiplexing sub-circuits includes the signal output terminal, an input terminal, a reset terminal, a low voltage level terminal, a first clock signal terminal and a second clock signal terminal. A first clock signal terminal, a second clock signal terminal, an input terminal and a low voltage level terminal of a first multiplexing sub-circuit are coupled to a first clock signal line, a second clock signal line, a third clock signal line, and a low voltage level line respectively. A signal output terminal of the first multiplexing sub-circuit is coupled to an input terminal of a second multiplexing sub-circuit, and a reset terminal of the first multiplexing sub-circuit is coupled to a signal output terminal of the second multiplexing sub-circuit. A first clock signal terminal, a second clock signal terminal and a low voltage level terminal of an $i^{th}$ multiplexing sub-circuit are coupled to the first clock signal line, the second clock signal line and the low voltage level line respectively. An input terminal of the $i^{th}$ multiplexing sub-circuit is coupled to a signal output terminal of an $(i-1)^{th}$ multiplexing sub-circuit, and a reset terminal of the $i^{th}$ multiplexing sub-circuit is coupled to a signal output terminal of an $(i+1)^{th}$ multiplexing sub-circuit. A first clock signal terminal, a second clock signal terminal and a low voltage level terminal of an $m^{th}$ multiplexing sub-circuit are coupled to the first clock signal line, the second clock signal line and the low voltage level line respectively, an input terminal of the $m^{th}$ multiplexing sub-circuit is coupled to a signal output terminal of an $(m-1)^{th}$ multiplexing sub-circuit, and a reset terminal of the $m^{th}$ multiplexing sub-circuit is coupled to an external reset signal terminal.

In an embodiment, the $i^{th}$ multiplexing sub-circuit includes a first control circuit and a second control circuit. The first control circuit is coupled to the first clock signal terminal, the second clock signal terminal, the input terminal, and the signal output terminal of the $i^{th}$ multiplexing sub-circuit. The second control circuit is coupled to the signal output terminal, the reset terminal and the low voltage level terminal of the $i^{th}$ multiplexing sub-circuit.

The first control circuit is configured to, in an $(i-1)^{th}$ time slot, receive a low-level first clock signal, a high-level second clock signal and a high-level third clock signal through the first clock signal terminal, the second clock signal terminal and the input terminal, and output a low-level signal from the signal output terminal under the control of the low-level first clock signal, the high-level second clock signal, and the high-level third clock signal; and is configured to, in the $i^{th}$ time slot, receive a high-level first clock signal through the first clock signal terminal, and output a high-level signal from the signal output terminal under the control of the high-level first clock signal.

The second control circuit is configured to, in an $(i+1)^{th}$ time slot, receive a low-level signal and a high-level reset signal through the low-voltage level terminal and the reset terminal respectively, and output a low-level signal from the signal output terminal under the low-level signal and the high-level reset signal.

In an embodiment, the first control circuit includes a first transistor, a second transistor, a first capacitor and a second capacitor.

A gate and a first terminal of the first transistor are coupled to the input terminal of the $i^{th}$ multiplexing sub-circuit; and a second terminal of the first transistor is coupled to the second control circuit, a gate of the second transistor, and one terminal of the first capacitor and one terminal of the second capacitor.

A first terminal of the second transistor is coupled to the first signal clock terminal of the $i^{th}$ multiplexing sub-circuit, and a second terminal of the second transistor is coupled to the other terminal of the first capacitor and the signal output terminal of the $i^{th}$ multiplexing sub-circuit, and the other terminal of the second capacitor is coupled to the second clock signal terminal of the $i^{th}$ multiplexing sub-circuit.

In the $(i-1)^{th}$ time slot, under the control of the low-level first clock signal received at the first clock signal terminal, the high-level second clock signal received at the second clock signal terminal, and the high-level third clock received at the input terminal, the first transistor and the second transistor are turned on, the first capacitor is charged, and the low-level first clock signal received at the first clock signal terminal is output from the signal output terminal.

In the $i^{th}$ time slot, under the control of the high-level first clock signal received at the first clock signal terminal, a low-level second clock signal received at the second clock signal terminal, a low-level third clock signal received at the input terminal, the first transistor is turned off, the second transistor is turned on, and the high-level first clock signal received at the first clock signal terminal is output from the signal output terminal.

In an embodiment, the second control circuit includes a third transistor and a fourth transistor. The third transistor includes a gate coupled to the reset terminal of the $i^{th}$ multiplexing sub-circuit, a first terminal coupled to the second terminal of the first transistor, and a second terminal coupled to the low voltage level terminal of the $i^{th}$ multiplexing sub-circuit.

The fourth transistor includes a gate coupled to the reset terminal, a first terminal coupled to the second terminal of the second transistor, and a second terminal coupled to the low voltage level terminal.

In the $(i+1)^{th}$ time slot, under the control of the high-level reset signal received at the reset terminal, the third transistor and the fourth transistor are turned on, and the low-level signal received at the low voltage level terminal is output from the signal output terminal.

In an embodiment, the scanning circuit for touch screen further includes: a clock signal controller, coupled to a first clock signal line, a second clock signal line, a third clock signal line, and a low voltage level line, respectively. The clock signal controller transmits a first clock signal, a second clock signal, a third clock signal and a low voltage level signal through the first clock signal line, the second clock signal line, the third clock signal line and the low voltage level line respectively.

In a second aspect, there is provided a touch screen, including the scanning circuit for a touch screen.

In a third aspect, there is provide a touch control method, which is applied to the scanning circuit for a touch screen, including: controlling the touch driving circuit to receive the output signals of the m receiving-electrode channels through the m signal input terminals in the $i^{th}$ time slot of the current scanning period of the touch panel; and determining the touch position according to the emitting-electrode channel corresponding to the current scanning period and the output signals of the m receiving-electrode channels, wherein the current scanning period includes n time slots, i=1, 2, ... n, and the output signals of the m receiving-electrode channels received by the touch driving circuit in each of the time slots are different, where both m and n are integers greater than or equal to 2.

BRIEF DESCRIPTION OF THE DRAWINGS

In order to more clearly illustrate the technical solution in the embodiments of the present disclosure, the drawings, which are used in the description of the embodiments, will be briefly described below. It will be apparent that, the drawings in the following description are merely examples of the present disclosure, and other drawings may be further obtained from these drawings by those skilled in the art without creative work.

DETAILED DESCRIPTION

In order to make the objective, the technical solution and advantages of the present disclosure clearer, below, the embodiments of the present disclosure will be further described in conjunction with the accompanying drawings in detail.

First Embodiment

Figure 1:
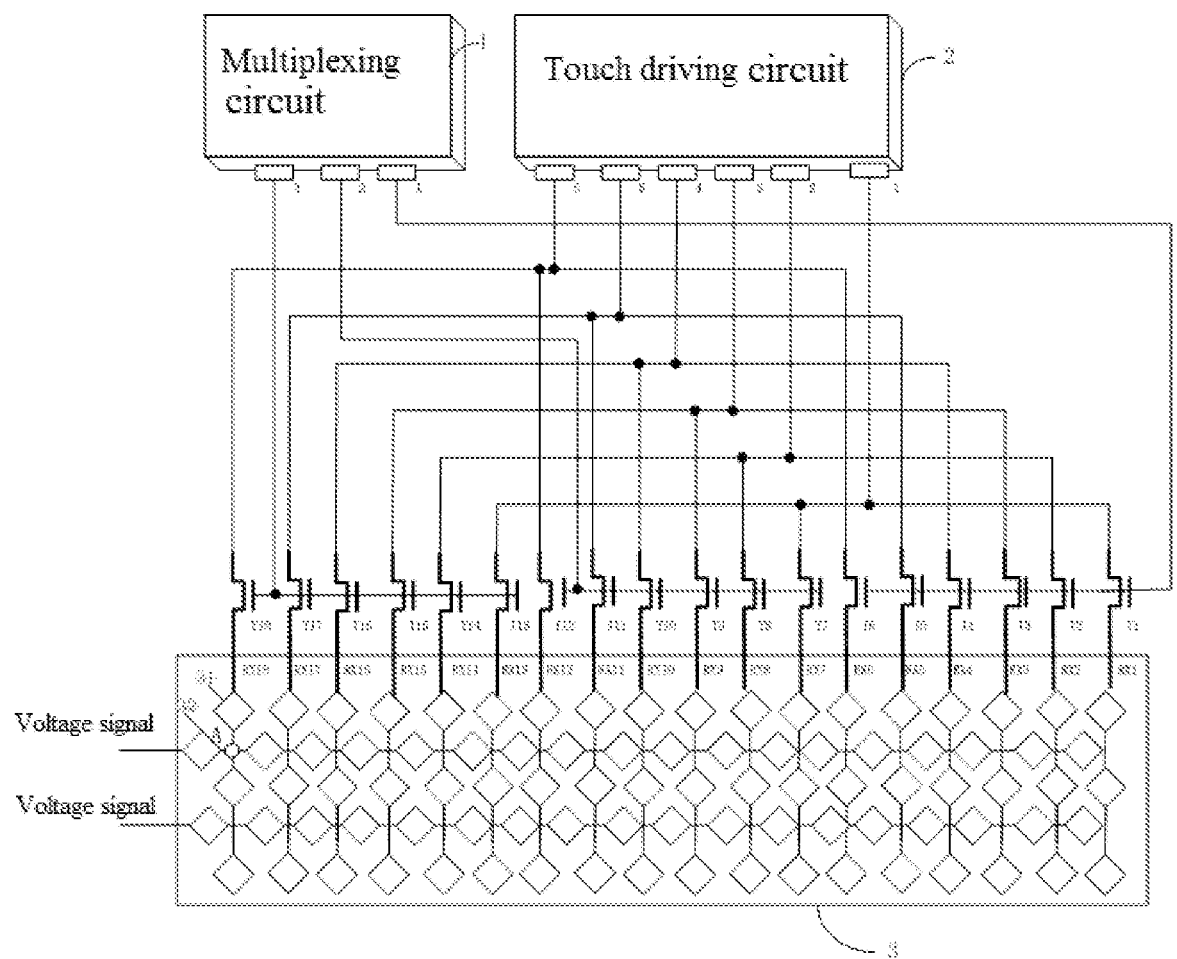
FIG. 1 is a schematic structure diagram of a scanning circuit for touch screen according to a first embodiment of the present disclosure.

Referring to FIG. 1, an embodiment of the present disclosure provides a scanning circuit for a touch screen.

The scanning circuit for a touch screen includes a multiplexing circuit 1 and a touch driving circuit 2 coupled to the multiplexing circuit 1.

The touch driving circuit 2 includes m signal input terminals, and each of the signal input terminals is coupled to n receiving-electrode channels in a touch panel 3 of the touch screen, where both m and n are integers greater than or equal to 2.

In an $i^{th}$ time slot of the current scanning period of the touch panel 3, the multiplexing circuit 1 controls the touch driving circuit 2 to receive, through the m signal input terminals, output signals from the m receiving-electrode channels, and determines the touch position according to the emitting-electrode channel corresponding to the current scanning period and the output signals of the m receiving-electrode channels.

The current scanning period includes n time slots, where i=1, 2, . . . n, and the output signals of the m receiving-electrode channels received by the touch driving circuit 2 in each of the n time slots are different.

Referring to FIG. 1, the touch panel 3 includes a plurality of rows of emitting-electrode channels and M columns of receiving-electrode channels, where M=m*n. Each row of emitting-electrode channel and each column of receiving-electrode channel may form a capacitor. Each column of receiving-electrode channel includes a column of receiving touch sensing electrodes 31, and each row of emitting-electrode channel includes a row of emitting touch sensing electrodes 32. In FIG. 1, m has a value of 6, and n has a value of 3, so M=m*n=18, that is, the touch panel 3 includes 18 columns of receiving-electrode channels.

The touch panel 3 scans the emitting-electrode channels row by row from the first row of emitting-electrode channel, and it takes one scanning period to scan each row of emitting-electrode channel. That is, only one row of emitting-electrode channel is scanned in one scanning period. When a row of emitting-electrode channel is scanned in a scanning period, a voltage signal is input to the emitting-electrode channel in the scanning period, and correspondingly, output signal is generated and output from each column of receiving-electrode channel.

The touch panel 3 includes M columns of receiving-electrode channels. The multiplexing circuit 1 controls the touch driving circuit 2 to receive, through the m signal input terminals, output signals sent by the m receiving-electrode channels in one time slot. One scanning period includes n time slots. So the touch driving circuit 2 may be controlled to receive the output signal from each column of receiving-electrode channel in one scanning period. If the user touches a position in a row of emitting-electrode channel currently being scanned in the current scanning period, the output signal generated from the receiving-electrode channel corresponding to the position may be delayed, and the delayed output signal is detected by the touch driving circuit 2. The touch driving circuit 2 may determine the position according to the detected receiving-electrode channel and the currently scanned emitting-electrode channel.

In an embodiment, referring to FIG. 1, each column of receiving-electrode channel includes a plurality of receiving sensing electrodes 31 arranged in the extending direction of data lines, and each row of emitting-electrode channel includes a plurality of emitting sensing electrodes 32 arranged in the extending direction of grid lines.

In the embodiment of the present disclosure, since the multiplexing circuit 1 may control the touch driving circuit 2 to receive the output signals from the m receiving-electrode channels in any one of the time slots included in the current scanning period, the touch screen driving circuit 2 may be controlled to receive the output signal from each column of receiving-electrode channel in the current scanning period. In this way, the number of the signal input terminals included in the touch driving circuit 2 may be set to be only one-$n^{th}$ of the number of the receiving-electrode channels included in the touch panel 3, so that the number of wirings of the scanning circuit for a touch screen, the difficulty in forming wirings and the costs of production may be reduced.

In an embodiment, still referring to FIG. 1, the scanning circuit for touch screen includes M transistors, i.e., m*n transistors, and the multiplexing circuit 1 includes n signal output terminals.

Each of the n signal output terminals is coupled to the gates of the m transistors, first terminals the m transistors are coupled to the m signal input terminals respectively, and second terminals of the m transistors are coupled to the m columns of receiving-electrode channels included in the touch panel 3 respectively.

In the $i^{th}$ time slot of the current scanning period, the multiplexing circuit 1 outputs a high-level signal from the $i^{th}$ signal output terminal, and outputs low-level signals from remaining n−1 signal output terminals, so as to control the m transistors connected to the $i^{th}$ signal output terminal to be turned on.

The touch driving circuit 2 receives, in the $i^{th}$ time slot, the output signals of the m receiving-electrode channels respectively coupled to the m transistors which are turned on.

For example, referring to the example shown in FIG. 1, the multiplexing circuit 1 includes three signal output terminals, which are signal output terminals 1, 2, and 3, respectively. The touch driving circuit 2 includes six signal input terminals, which are signal input terminals 1, 2, 3, 4, 5, and 6 respectively. The touch panel 3 includes 18 columns of receiving-electrode channels, which are receiving-electrode channels RX1, RX2, RX3, . . . , RX18 respectively. One scanning period includes 3 time slots.

The signal output terminal 1 is coupled to the gates of six transistors which are the transistors T1, T2, T3, T4, T5 and T6, respectively. The first terminals of the transistors T1, T2, T3, T4, T5 and T6 are coupled to the signal input terminals 1, 2, 3, 4, 5, and 6 included in the touch driving circuit 2 respectively, and the second terminals thereof are coupled to the receiving-electrode channels RX1, RX2, RX3, RX4, RX5 and RX6 included in the touch panel 3 respectively.

The signal output terminal 2 is coupled to the gates of six transistors which are the transistors T7, T8, T9, T10, T11 and T12, respectively. The first terminals of the transistors T7, T8, T9, T10, T11 and T12 are coupled to the signal input terminals 1, 2, 3, 4, 5, and 6 included in the touch driving circuit 2 respectively, and the second terminals thereof are coupled to the receiving-electrode channels RX7, RX8, RX9, RX10, RX11 and RX12 included in the touch panel 3 respectively.

The signal output terminal 3 is coupled to the gates of six transistors which are the transistors T13, T14, T15, T16, T17 and T18, respectively. The first terminals of the transistors T13, T14, T15, T16, T17 and T18 are coupled to the signal input terminals 1, 2, 3, 4, 5, and 6 included in the touch driving circuit 2 respectively, and the second terminals thereof are coupled to the receiving-electrode channels RX13, RX14, RX15, RX16, RX17 and RX18 included in the touch panel 3 respectively.

In the first time slot of the current scanning period, the multiplexing circuit 1 outputs a high-level signal from the signal output terminal 1, and low-level signals from the signal output terminals 2 and 3, controls the transistors T1, T2, T3, T4, T5 and T6 connected to the signal output terminal 1 to be turned on, and controls the transistors T7, T8, T9, T10, T11, T12, T13, T14, T15, T16, T17 and T18 to be turned off. Therefore, in the first time slot, the touch driving circuit 2 receives the output signals of the receiving-electrode channels RX1, RX2, RX3, RX4, RX5 and RX6 through the transistors T1, T2, T3, T4, T5 and T6 respectively.

In the second time slot of the current scanning period, the multiplexing circuit 1 outputs a high-level signal from the signal output terminal 2, and low-level signals from the signal output terminals 1 and 3, controls the transistors T7, T8, T9, T10, T11 and T12 connected to the signal output terminal 2 to be turned on, and controls the transistors T1, T2, T3, T4, T5, T6, T13, T14, T15, T16, T17 and T18 to be turned off. Therefore, in the second time slot, the touch driving circuit 2 receives the output signals of the receiving-electrode channels RX7, RX8, RX9, RX10, RX11 and RX12 through the transistors T7, T8, T9, T10, T11 and T12 respectively.

In the third time slot of the current scanning period, the multiplexing circuit 1 outputs a high-level signal from the signal output terminal 3, and low-level signals from the signal output terminals 1 and 2, controls the transistors T13, T14, T15, T16, T17 and T18 connected to the signal output terminal 3 to be turned on, and controls the transistors T1, T2, T3, T4, T5, T6, T7, T8, T9, T10, T11 and T12 to be turned off. Therefore, in the third time slot, the touch driving circuit 2 receives the output signals of the receiving-electrode channels RX13, RX14, RX15, RX16, RX17 and RX18 through the transistors T13, T14, T15, T16, T17 and T18 respectively.

If the first row of emitting-electrode channel is being scanned in the current scanning period and the position at point A is touched as shown in FIG. 1, the output signal from the receiving-electrode channel RX18 where the point A is located would be delayed. In the third time slot, the touch driving circuit 2 receives the output signals from the receiving-electrode channels RX13, RX14, RX15, RX16, RX17 and RX18, and may detect the delay of the output signal from the receiving-electrode channel RX18. Therefore, the touch position of point A may be determined according to the receiving-electrode channel RX18 and the first row of emitting-electrode channel being scanned currently.

In an embodiment of the present disclosure, the multiplexing circuit 1 may be a shifter, which includes n signal output terminals. In an $i^{th}$ time slot, an $i^{th}$ signal output terminal included in the shifter outputs a high-level signal, and the remaining n−1 signal output terminals output low-level signals.

In an embodiment, the multiplexing circuit 1 includes n multiplexing sub-circuit, each of which includes a signal output terminal coupled to the gates of the m transistors. In the $i^{th}$ time slot of the current scanning period, an $i^{th}$ multiplexing sub-circuit in the multiplexing circuit 1 outputs a high-level signal, and the remaining n−1 multiplexing sub-circuits output low-level signals.

Figure 2:
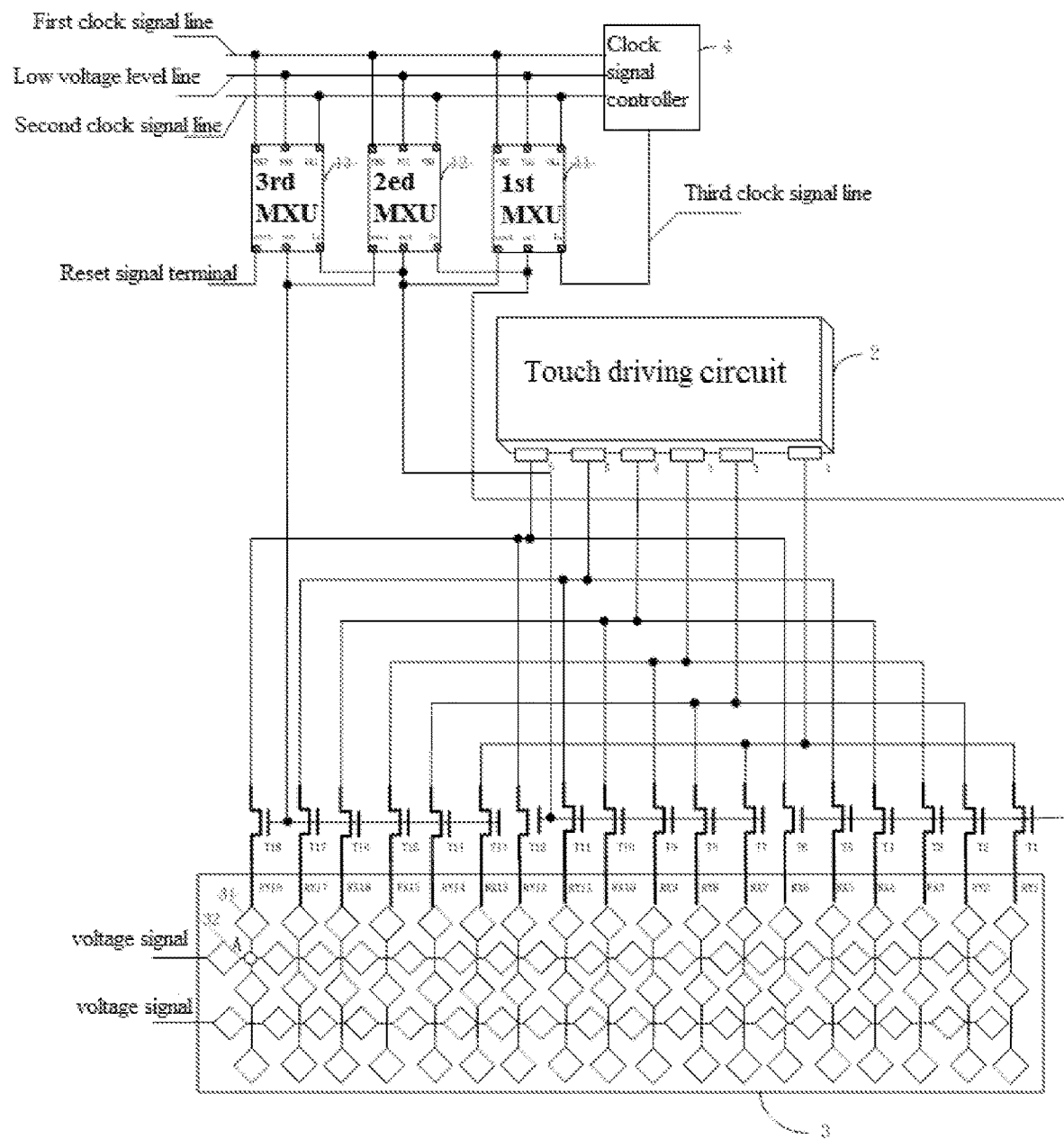
FIG. 2 is a schematic structure diagram of another scanning circuit for touch screen according to the first embodiment of the present disclosure.

For example, referring to FIG. 2, the multiplexing circuit 1 includes a first multiplexing sub-circuit 11, a second multiplexing sub-circuit 12 and a third multiplexing sub-circuit 13. The first multiplexing sub-circuit 11 is connected to the gates of the transistors T1, T2, T3, T4, T5 and T6. In the first time slot of the current scanning period, the first multiplexing sub-circuit 11 outputs a high-level signal to control the transistors T1, T2, T3, T4, T5 and T6 to be turned on. The second multiplexing sub-circuit 12 is coupled to the gates of the transistors T7, T8, T9, T10, T11 and T12. In the second time slot of the current scanning period, the second multiplexing sub-circuit 12 outputs a high-level signal to control the transistors T7, T8, T9, T10, T11, T12 to be turned on. The third multiplexing sub-circuit 13 is coupled to the gates of the transistors T13, T14, T15, T16, T17 and T18. In the third time slot of the current scanning period, the third multiplexing sub-circuit 13 outputs a high-level signal to control the transistors T13, T14, T15, T16, T17 and T18 to be turned on.

In an embodiment, still referring to FIG. 2, each of the multiplexing sub-circuit includes a signal output terminal 'out', an input terminal 'in', a reset terminal 'reset', a low voltage level terminal VSS, a first clock signal terminal CK1 and a second clock signal terminal CK2.

A first clock signal terminal CK1, a second clock signal terminal CK2, an input terminal 'in' and a low voltage level terminal VSS of the first multiplexing sub-circuit are coupled to a first clock signal line, a second clock signal line, a third clock signal line, and a low voltage level line respectively, a signal output terminal 'out' of the first multiplexing sub-circuit is coupled to an input terminal 'in' of a second multiplexing sub-circuit, and the reset terminal 'reset' of the first multiplexing sub-circuit is coupled to a signal output terminal 'out' of the second multiplexing sub-circuit.

A first clock signal terminal CK1, a second clock signal terminal CK2 and a low voltage level terminal VSS of an $i^{th}$ multiplexing sub-circuit are coupled to the first clock signal line, the second clock signal line and the low voltage level line respectively, an input terminal 'in' of the $i^{th}$ multiplexing sub-circuit is coupled to a signal output terminal 'out' of an $(i-1)^{th}$ multiplexing sub-circuit, and the reset terminal of the $i^{th}$ multiplexing sub-circuit is coupled to a signal output terminal 'out' of an $(i+1)^{th}$ multiplexing sub-circuit.

A first clock signal terminal CK1, a second clock signal terminal CK2 and a low voltage level terminal VSS of an $m^{th}$ multiplexing sub-circuit are coupled to the first clock signal line, the second clock signal line and the low voltage level line respectively, an input terminal 'in' of the $m^{th}$ multiplexing sub-circuit is coupled to a signal output terminal 'out' of an $(m-1)^{th}$ multiplexing sub-circuit, and the reset terminal 'reset' of the $m^{th}$ multiplexing sub-circuit is coupled to an external reset signal terminal.

In the $i^{th}$ slot, the $i^{th}$ multiplexing sub-circuit receives the first clock signal, the second clock signal, the third clock signal, the low-voltage level signal and the reset signal through the first clock signal terminal CK1, the second clock signal terminal CK2, the input terminal 'in', the low voltage level terminal VSS, and the reset terminal 'reset' thereof respectively, and under the control of the first clock signal, the second clock signal, the third clock signal, the low-voltage level signal and the reset signal, outputs a high-level signal to the m transistors connected to the $i^{th}$ multiplexing sub-circuit, so as to turn on the m transistors.

For example, referring to FIG. 2, in the first time slot, the first multiplexing sub-circuit 11 receives the first clock signal, the second clock signal, the third clock signal, the low-voltage level signal and the reset signal through the first clock signal terminal CK1, the second clock signal terminal CK2, the input terminal 'in', the low voltage level terminal VSS, and the reset terminal 'reset' thereof respectively, and under the control of the first clock signal, the second clock signal, the third clock signal, the low-voltage level signal and the reset signal, outputs a high-level signal to the transistors T1, T2, T3, T4, T5 and T6 connected to the first multiplexing sub-circuit 11, so as to turn on the same. In the second time slot, the second multiplexing sub-circuit 12 receives the first clock signal, the second clock signal, the third clock signal, the low-voltage level signal and the reset signal through the first clock signal terminal CK1, the second clock signal terminal CK2, the input terminal 'in', the low voltage level terminal VSS, and the reset terminal 'reset' thereof respectively, and under the control of the first clock signal, the second clock signal, the third clock signal, the low-voltage level signal and the reset signal, outputs a high-level signal to the transistors T7, T8, T9, T10, T11 and T12 connected to the second multiplexing sub-circuit 12, so as to turn on the same. In the third time slot, the third multiplexing sub-circuit 13 receives the first clock signal, the second clock signal, the third clock signal, the low-voltage level signal and the reset signal through the first clock signal terminal CK1, the second clock signal terminal CK2, the input terminal 'in', the low voltage level terminal VSS, and the reset terminal 'reset' thereof respectively, and under the control of the first clock signal, the second clock signal, the third clock signal, the low-voltage level signal and the reset signal, outputs a high-level signal to the transistors T13, T14, T15, T16, T17 and T18 connected to the third multiplexing sub-circuit 13, so as to turn on the same.

Figure 3:
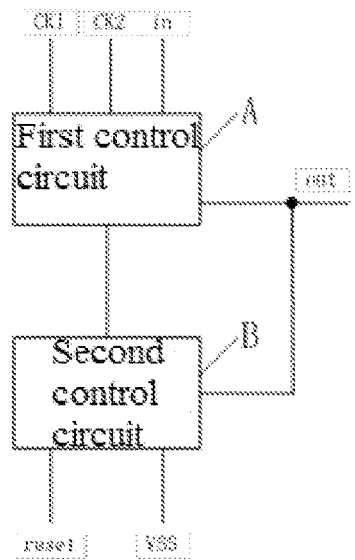
FIG. 3 is a structure block diagram of a multiplexing sub-circuit according to a second embodiment of the present disclosure.

In an embodiment, referring to FIG. 3 with respect to the $i^{th}$ multiplexing sub-circuit, the $i^{th}$ multiplexing sub-circuit includes a first control circuit A and a second control circuit B. The first control circuit A is coupled to the first clock signal terminal CK1, the second clock signal terminal CK2, the input terminal 'in', and the signal output terminal 'out' of the multiplexing sub-circuit, and the second control circuit B is coupled to the signal output terminal 'out', the reset terminal 'reset' and the low voltage level terminal 'VSS' of the multiplexing sub-circuit.

In an $(i-1)^{th}$ time slot, the first control circuit A receives a low-level first clock signal, a high-level second clock signal and a high-level third clock signal through the first clock signal terminal CK1, the second clock signal terminal CK2 and the input terminal 'in', and outputs a low-level signal from the signal output terminal 'out' under the control of the low-level first clock signal, the high-level second clock signal, and the high-level third clock signal. In the $i^{th}$ time slot. The first control circuit A receives a high-level first clock signal through the first clock signal terminal CK1, and outputs a high-level signal from the signal output terminal 'out' under the control of the high-level first clock signal.

In an $(i+1)^{th}$ time slot, the second control circuit B receives a low-level signal and a high-level reset signal through the low-voltage level terminal VSS and the reset terminal 'reset' respectively, and outputs a low-level signal from the signal output terminal 'out' under the low-level signal and the high-level reset signal.

Figure 4:
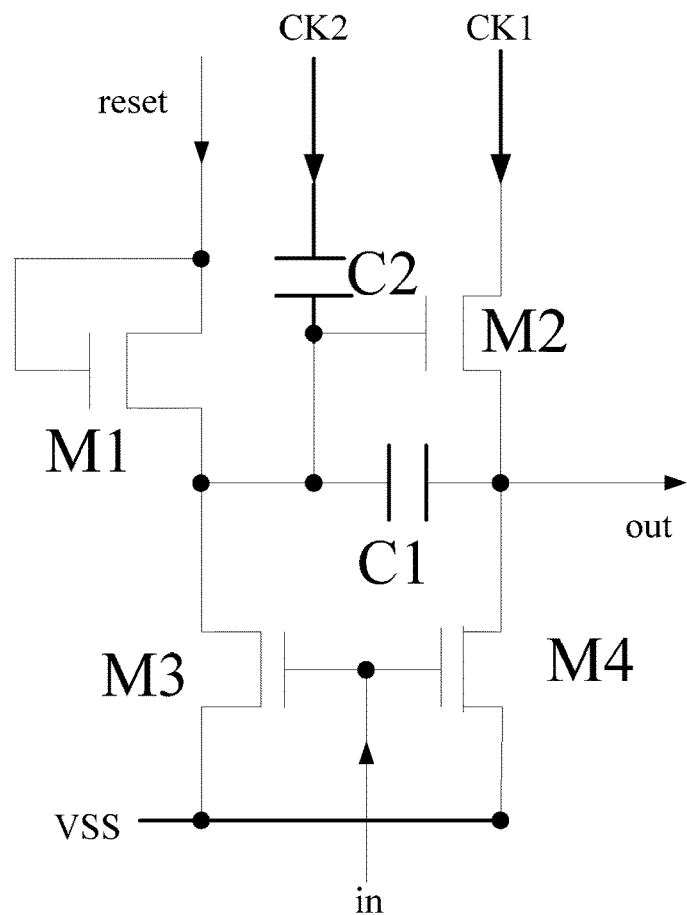
FIG. 4 is a circuit structure diagram of the multiplexing sub-circuit according to the second embodiment of the present disclosure.

In an embodiment, referring to FIG. 4, the first control circuit A includes a first transistor M1, a second transistor M2, a first capacitor C1 and a second capacitor C2.

A gate and a first terminal of the first transistor M1 are coupled to the input terminal 'in', and a second terminal of the first transistor M1 is coupled to the second control circuit B, a gate of the second transistor M2, and one terminal of the first capacitor C1 and one terminal of the second capacitor C2.

A first terminal of the second transistor M2 is coupled to the first signal clock terminal CK1; and a second terminal of the second transistor M2 is coupled to the other terminal of the first capacitor C1 and the signal output terminal 'out', and the other terminal of the second capacitor C2 is coupled to the second clock signal terminal CK2.

Figure 5:
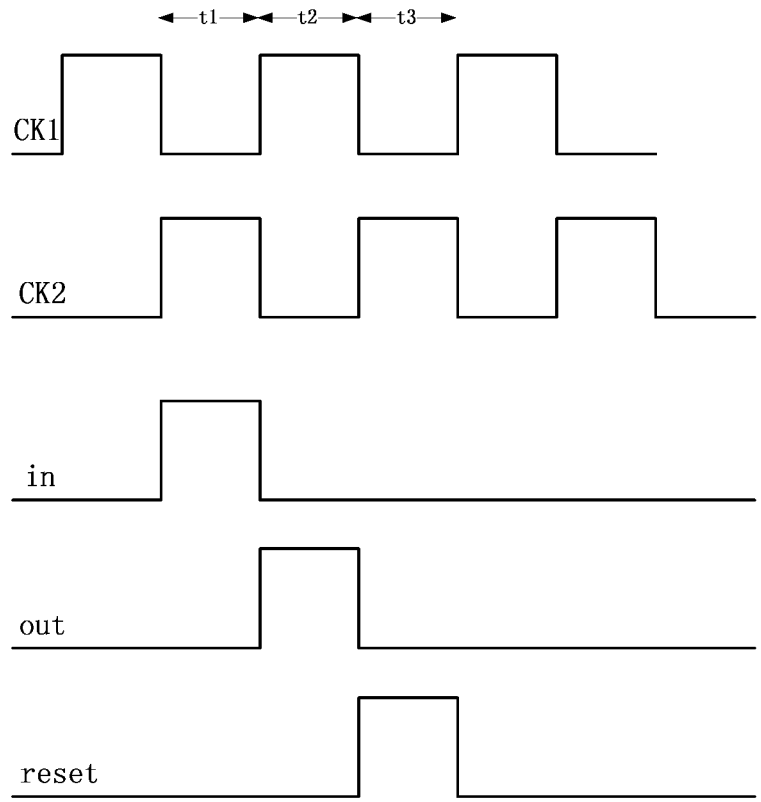
FIG. 5 is a signal timing diagram according to the second embodiment of the present disclosure.

Referring to FIG. 5, in the $(i-1)^{th}$ time slot t1, under the control of the low-level first clock signal received at the first clock signal terminal CK1, the high-level second clock signal received at the second clock signal terminal CK2, and the high-level third clock received at the input terminal 'in', the first transistor M1 and the second transistor M2 are turned on, the first capacitor C1 is charged, and the low-level first clock signal received at the first clock signal terminal CK1 is output from the signal output terminal 'out'.

In the $i^{th}$ time slot t2, under the control of the high-level first clock signal received at the first clock signal terminal CK1, a low-level second clock signal received at the second clock signal terminal CK2, and a low-level third clock signal received at the input terminal 'in', the first transistor M1 is turned off, the second transistor M2 is turned on, and the high-level first clock signal received at the first clock signal terminal CK1 is output from the signal output terminal 'out'.

It should be noted that, in the $(i-1)^{th}$ time slot, the second transistor M2 is in a semi-conductive state and the first capacitor C1 is charged. The voltage at the terminal of the first capacitor C1 connected to the gate of the second transistor M2 is higher than that at the other terminal thereof. The second transistor M2 is still in the semi-conductive state immediately after the $i^{th}$ time slot starts. In the $i^{th}$ time slot, the first clock signal terminal CK1 receives the high-level first clock signal, which is output to the other terminal of the first capacitor C1, such that the voltage at the terminal of the first capacitor C1 connected to the gate of the second transistor M2 is further boosted by the bootstrap effect of the first capacitor C1, and thus the second transistor M2 is completely turned on in the $i^{th}$ time slot.

In an embodiment, the second control circuit B includes a third transistor M3 and a fourth transistor M4. The third transistor M3 includes a gate coupled to the reset terminal 'reset', a first terminal coupled to the second terminal of the first transistor M1 of the first control circuit A, and a second terminal coupled to the low voltage level terminal VSS.

The fourth transistor M4 includes a gate coupled to the reset terminal 'reset', a first terminal coupled to the second terminal of the second transistor M2 of the first control circuit A, and a second terminal coupled to the low voltage level terminal VSS.

In the $(i+1)^{th}$ time slot t3, under the control of the high-level reset signal received at the reset terminal 'reset', the third transistor M3 and the fourth transistor M4 are turned on, and the low-level signal received at the low voltage level terminal VSS is output from the signal output terminal 'out'.

In an embodiment, referring to FIG. 2, the scanning circuit for a touch screen further includes a clock signal controller 4.

The clock signal controller 4 are coupled to the first clock signal line, the second clock signal line, the third clock signal line, and the low voltage level line, respectively.

The clock signal controller 4 transmits the first clock signal, the second clock signal, the third clock signal and the low voltage level signal through the first clock signal line, the second clock signal line, the third clock signal line and the low voltage level line respectively.

Figure 6:
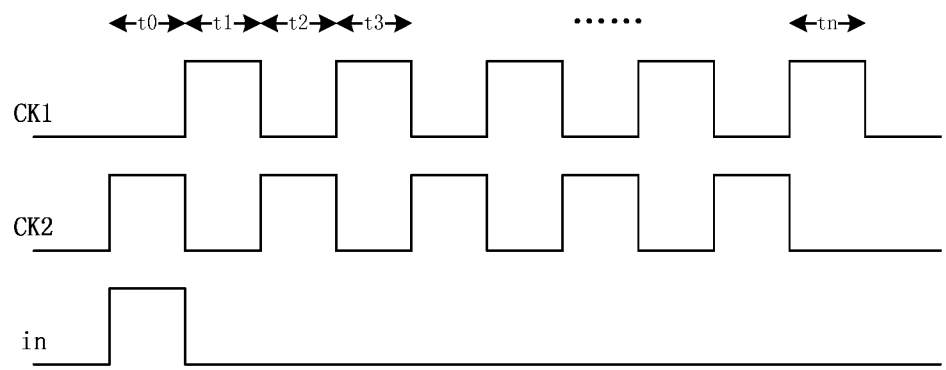
FIG. 6 is another signal timing diagram according to the second embodiment of the present disclosure.

Referring to FIG. 6, the clock signal controller 4 may generate a first clock signal, a second clock signal, and a third clock signal having n+1 time slots, wherein the n+1 time slots are the $0^{th}$ time slot t0, the first slot t1, . . . , the $n^{th}$ slot t0. In the $0^{th}$ time slot, the second transistor M2 and the first capacitor C1 of the first multiplexing sub-circuit are respectively controlled to be turned on and be charged by the first clock signal, the second clock signal, the third clock signal and the low-voltage level signal, which ensures that when the first time slot starts, the first multiplexing sub-circuit is controlled to output a high-level signal.

In the embodiment of the present disclosure, each of the n signal output terminals of the multiplexing circuit is coupled to the gates of the m transistors, the first terminals of the m transistors are coupled to the m signal input terminals of the touch driving circuit, and the second terminals of the m transistor are connected to the m receiving-electrode channels of the touch panel, so each of the signal output terminals of the touch driving circuit is coupled to n receiving-electrode channels. In addition, the scanning period is divided into n time slots. In each time slot, the touch driving circuit is controlled to receive the output signals from the m receiving-electrode channels, and a touch position may be determined according to the m receiving-electrode channels. Therefore, the number of signal input terminals included in the touch driving circuit is only one-$n^{th}$ of the number of receiving-electrode channels included in the touch panel, so that the number of the signal input terminals included in the touch driving circuit is reduced, which may decrease the difficulty in forming wirings and the costs of production.

Second Embodiment

An embodiment of the present disclosure provides a touch screen, including any one of the scanning circuits for a touch screen in the first embodiment.

Third Embodiment

Figure 7:
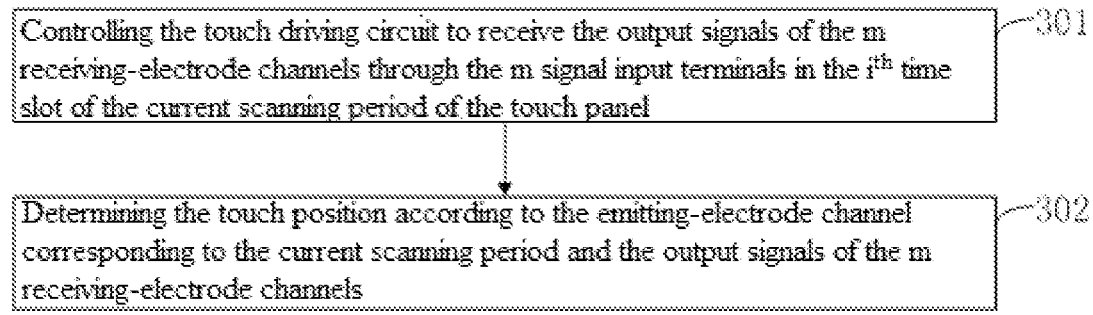
FIG. 7 is a flow chart of a touch control method according to a third embodiment of the present disclosure.

Referring to FIG. 7, an embodiment of the present disclosure provides a touch control method including the following steps.

In step 301, the touch driving circuit in controlled to receive the output signals of the m receiving-electrode channels through the m signal input terminals in the $i^{th}$ time slot of the current scanning period of the touch panel.

In step 302, the touch position is determined according to the emitting-electrode channel corresponding to the current scanning period and the output signals of the m receiving-electrode channels.

The current scanning period includes n time slots, i=1, 2, . . . n, and the output signals of the m receiving-electrode channels received by the touch driving circuit in each of the time slots are different, where both m and n are integers greater than or equal to 2.

In an embodiment, in the step 301, in the $i^{th}$ time slot of the current scanning period, a high-level signal is output from the $i^{th}$ signal output terminal of the multiplexing circuit, and low-level signals are output from the remaining n−1 signal output terminals, so that the m transistors connected to the $i^{th}$ signal output terminal are controlled to be turned on; and in the $i^{th}$ time slot, the output signals are received from the m receiving-electrode channels coupled to the m transistors which are turned on, respectively.

According to the embodiment of the present disclosure, the scanning period is divided into n time slots. In each time slot, the touch driving circuit is controlled to receive the output signals from the m receiving-electrode channels, and a touch position may be determined according to the m receiving-electrode channels. Therefore, the number of the signal input terminals included in the touch driving circuit is reduced, which may decrease the difficulty in forming wirings and the costs of production.

The serial numbers of the foregoing embodiments of the present disclosure are merely for description and do not represent the ranking of the embodiments.

The above is only the preferred embodiments of the present disclosure and is not intended to limit the present disclosure. Any modifications, equivalent substitutions, improvements, etc. within the spirit and principle of the present disclosure should be included in the protection scope of the present disclosure.

What is claimed is:

1. A scanning circuit for a touch screen comprising a touch panel, the touch panel comprising a plurality of emitting-electrode channels, each of which comprises a plurality of emitting touch sensing electrodes connected in series, and a plurality of receiving-electrode channels, each of which comprises a plurality of receiving touch sensing electrodes connected in series, the scanning circuit comprising: a multiplexing circuit and a touch driving circuit coupled to the multiplexing circuit, wherein the touch driving circuit comprises m signal input terminals, and each of the m signal input terminals is coupled to n receiving-electrode channels of the plurality of receiving-electrode channels, where both m and n are integers greater than or equal to 2, and the multiplexing circuit is configured to, in an $i^{th}$ time slot of a current scanning period of the touch panel, control the touch driving circuit to receive, through the m signal input terminals, output signals from m receiving-electrode channels of the plurality of receiving-electrode channels, and to determine a touch position according to the emitting-electrode channel corresponding to the current scanning period and the output signals of the m receiving-electrode channels, wherein the current scanning period comprises n time slots, where i=1, 2, . . . n, and the output signals of the m receiving-electrode channels received by the touch driving circuit in each of the time slots are different.

2. The scanning circuit for a touch screen according to claim 1, comprising: M transistors, wherein M=m*n, and the multiplexing circuit comprises n signal output terminals, each of the n signal output terminals is coupled to gates of m transistors, first terminals of the m transistors are coupled to the m signal input terminals respectively, and second terminals of the m transistors are coupled to the m receiving-electrode channels in the touch panel respectively, the multiplexing circuit is configured to, in the $i^{th}$ time slot of the current scanning period, output a high-level signal from an $i^{th}$ signal output terminal, and to output low-level signals from the remaining n−1 signal output terminals, so as to control the m transistors connected to the $i^{th}$ signal output terminal to be turned on, and the touch driving circuit is configured to receive, in the $i^{th}$ time slot, the output signals of the m receiving-electrode channels respectively coupled to the m transistors which are turned on.

3. The scanning circuit for a touch screen according to claim 2, wherein the multiplexing circuit comprises n multiplexing sub-circuits, each of the n multiplexing sub-circuits comprises a signal output terminal coupled to the gates of the m transistors; and in the $i^{th}$ time slot of the current scanning period, an $i^{th}$ multiplexing sub-circuit in the multiplexing circuit outputs a high-level signal, and remaining n−1 multiplexing sub-circuits output low-level signals.

4. The scanning circuit for a touch screen according to claim 3, wherein,
- each of the n multiplexing sub-circuits comprises the signal output terminal, an input terminal, a reset terminal, a low voltage level terminal, a first clock signal terminal, and a second clock signal terminal,
- a first clock signal terminal, a second clock signal terminal, an input terminal and a low voltage level terminal of a first multiplexing sub-circuit are coupled to a first clock signal line, a second clock signal line, a third clock signal line, and a low voltage level line respectively, a signal output terminal of the first multiplexing sub-circuit is coupled to an input terminal of a second multiplexing sub-circuit, and a reset terminal of the first multiplexing sub-circuit is coupled to a signal output terminal of the second multiplexing sub-circuit,
- a first clock signal terminal, a second clock signal terminal and a low voltage level terminal of an $i^{th}$ multiplexing sub-circuit are coupled to the first clock signal line, the second clock signal-line and the low voltage level line respectively, an input terminal of the $i^{th}$ multiplexing sub-circuit is coupled to a signal output terminal of an $(i-1)^{th}$ multiplexing sub-circuit, and a reset terminal of the $i^{th}$ multiplexing sub-circuit is coupled to a signal output terminal of an $(i+1)^{th}$ multiplexing sub-circuit, and
- a first clock signal terminal, a second clock signal terminal and a low voltage level terminal of an $m^{th}$ multiplexing sub-circuit are coupled to the first clock signal line, the second clock signal line and the low voltage level line respectively, an input terminal of the $m^{th}$ multiplexing sub-circuit is coupled to a signal output terminal of an $(m-1)^{th}$ multiplexing sub-circuit, and a reset terminal of the $m^{th}$ multiplexing sub-circuit is coupled to an external reset signal terminal.

5. The scanning circuit for a touch screen according to claim 4, wherein the $i^{th}$ multiplexing sub-circuit comprises a first control circuit and a second control circuit, the first control circuit is coupled to the first clock signal terminal, the second clock signal terminal, the input terminal, and the signal output terminal of the $i^{th}$ multiplexing sub-circuit, and the second control circuit is coupled to the signal output terminal, the reset terminal and the low voltage level terminal of the $i^{th}$ multiplexing sub-circuit,
- the first control circuit is configured to, in an $(i-1)^{th}$ time slot, receive a low-level first clock signal, a high-level second clock signal and a high-level third clock signal through the first clock signal terminal, the second clock signal terminal and the input terminal, and to output a low-level signal from the signal output terminal under the control of the low-level first clock signal, the high-level second clock signal, and the high-level third clock signal; and is configured to, in the $i^{th}$ time slot, receive a high-level first clock signal through the first clock signal terminal, and to output a high-level signal from the signal output terminal under the control of the high-level first clock signal, and
- the second control circuit is configured to, in an $(i+1)^{th}$ time slot, receive a low-level signal and a high-level reset signal through the low-voltage level terminal and the reset terminal respectively, and to output a low-level signal from the signal output terminal under the low-level signal and the high-level reset signal.

6. The scanning circuit for a touch screen according to claim 5, wherein the first control circuit comprises a first transistor, a second transistor, a first capacitor and a second capacitor,
- a gate and a first terminal of the first transistor are coupled to the input terminal of the $i^{th}$ multiplexing sub-circuit, and a second terminal of the first transistor is coupled to the second control circuit, a gate of the second transistor, and one terminal of the first capacitor and one terminal of the second capacitor,
- a first terminal of the second transistor is coupled to the first signal clock terminal of the $i^{th}$ multiplexing sub-circuit, and a second terminal of the second transistor is coupled to the other terminal of the first capacitor and the signal output terminal of the $i^{th}$ multiplexing sub-circuit, and the other terminal of the second capacitor is coupled to the second clock signal terminal of the $i^{th}$ multiplexing sub-circuit,
- in the $(i-1)^{th}$ time slot, under the control of the low-level first clock signal received at the first clock signal terminal, the high-level second clock signal received at the second clock signal terminal, and the high-level third clock signal received at the input terminal, the first transistor and the second transistor are turned on, the first capacitor is charged, and the low-level first clock signal received at the first clock signal terminal is output from the signal output terminal, and
- in the $i^{th}$ time slot, under the control of the high-level first clock signal received at the first clock signal terminal, a low-level second clock signal received at the second clock signal terminal, a low-level third clock signal received at the input terminal, the first transistor is turned off, the second transistor is turned on, and the high-level first clock signal received at the first clock signal terminal is output from the signal output terminal.

7. The scanning circuit for a touch screen according to claim 6, wherein the second control circuit comprises a third transistor and a fourth transistor, and the third transistor comprises a gate coupled to the reset terminal of the $i^{th}$ multiplexing sub-circuit, a first terminal coupled to the second terminal of the first transistor, and a second terminal coupled to the low voltage level terminal of the $i^{th}$ multiplexing sub-circuit,
- the fourth transistor comprises a gate coupled to the reset terminal, a first terminal coupled to the second terminal of the second transistor, and a second terminal coupled to the low voltage level terminal,
- in the $(i+1)^{th}$ time slot, under the control of the high-level reset signal received at the reset terminal, the third transistor and the fourth transistor are turned on, and the low-level signal received at the low voltage level terminal is output from the signal output terminal.

8. The scanning circuit for a touch screen according to claim 1, further comprising:
- a clock signal controller, coupled to a first clock signal line, a second clock signal line, a third clock signal line, and a low voltage level line, respectively, the clock signal controller transmits a first clock signal, a second clock signal, a third clock signal and a low voltage level signal through the first clock signal line, the second clock signal line, the third clock signal line and the low voltage level line respectively.

9. A touch screen, comprising the scanning circuit for a touch screen according to claim 1.

10. The touch screen according to claim 9, wherein the scanning circuit for a touch screen comprises M transistors, wherein M=m*n, and the multiplexing circuit comprises n signal output terminals, each of the n signal output terminals is coupled to gates of m transistors, first terminals of the m transistors are coupled to the m signal input terminals respectively, and second terminals of the m transistors are coupled to the m receiving-electrode channels in the touch panel respectively, the multiplexing circuit is configured to, in the $i^{th}$ time slot of the current scanning period, output a high-level signal from an $i^{th}$ signal output terminal, and to output low-level signals from the remaining n−1 signal output terminals, so as to control the m transistors connected to the ith signal output terminal to be turned on, and the touch driving circuit is configured to receive, in the $i^{th}$ time slot, the output signals of the m receiving-electrode channels respectively coupled to the m transistors which are turned on.

11. The touch screen according to claim 10, wherein the multiplexing circuit comprises n multiplexing sub-circuits, each of the n multiplexing sub-circuits comprises a signal output terminal coupled to the gates of the m transistors; and in the $i^{th}$ time slot of the current scanning period, an $i^{th}$ multiplexing sub-circuit in the multiplexing circuit outputs a high-level signal, and the remaining n−1 multiplexing sub-circuits output low-level signals.

12. The touch screen according to claim 11, wherein, each of the multiplexing sub-circuits comprises the signal output terminal, an input terminal, a reset terminal, a low voltage level terminal, a first clock signal terminal and a second clock signal terminal, a first clock signal terminal, a second clock signal terminal, an input terminal and a low voltage level terminal of a first multiplexing sub-circuit are coupled to a first clock signal line, a second clock signal line, a third clock signal line, and a low voltage level line respectively, a signal output terminal of the first multiplexing sub-circuit is coupled to an input terminal of a second multiplexing sub-circuit, and a reset terminal of the first multiplexing sub-circuit is coupled to a signal output terminal of the second multiplexing sub-circuit, a first clock signal terminal, a second clock signal terminal and a low voltage level terminal of an $i^{th}$ multiplexing sub-circuit are coupled to the first clock signal line, the second clock signal line and the low voltage level line respectively, an input terminal of the $i^{th}$ multiplexing sub-circuit is coupled to a signal output terminal of an $(i-1)^{th}$ multiplexing sub-circuit, and a reset terminal of the $i^{th}$ multiplexing sub-circuit is coupled to a signal output terminal of an $(i+1)^{th}$ multiplexing sub-circuit, and a first clock signal terminal, a second clock signal terminal and a low voltage level terminal of an $m^{th}$ multiplexing sub-circuit are coupled to the first clock signal line, the second clock signal line and the low voltage level line respectively, an input terminal of the $m^{th}$ multiplexing sub-circuit is coupled to a signal output terminal of an $(m-1)^{th}$ multiplexing sub-circuit, and a reset terminal of the $m^{th}$ multiplexing sub-circuit is coupled to an external reset signal terminal.

13. The touch screen according to claim 12, wherein the $i^{th}$ multiplexing sub-circuit comprises a first control circuit and a second control circuit, the first control circuit is coupled to the first clock signal terminal, the second clock signal terminal, the input terminal, and the signal output terminal of the $i^{th}$ multiplexing sub-circuit, and the second control circuit is coupled to the signal output terminal, the reset terminal and the low voltage level terminal of the $i^{th}$ multiplexing sub-circuit, the first control circuit is configured to, in an (i−1)th time slot, receive a low-level first clock signal, a high-level second clock signal and a high-level third clock signal through the first clock signal terminal, the second clock signal terminal and the input terminal, and to output a low-level signal from the signal output terminal under the control of the low-level first clock signal, the high-level second clock signal, and the high-level third clock signal; and is configured to, in the ith time slot, receive a high-level first clock signal through the first clock signal terminal, and to output a high-level signal from the signal output terminal under the control of the high-level first clock signal, and the second control circuit is configured to, in an $(i+1)^{th}$ time slot, receive a low-level signal and a high-level reset signal through the low-voltage level terminal and the reset terminal respectively, and to output a low-level signal from the signal output terminal under the low-level signal and the high-level reset signal.

14. The touch screen according to claim 13, wherein the first control circuit comprises a first transistor, a second transistor, a first capacitor and a second capacitor, a gate and a first terminal of the first transistor are coupled to the input terminal of the $i^{th}$ multiplexing sub-circuit, and a second terminal of the first transistor is coupled to the second control circuit, a gate of the second transistor, and one terminal of the first capacitor and one terminal of the second capacitor, a first terminal of the second transistor is coupled to the first signal clock terminal of the $i^{th}$ multiplexing sub-circuit, and a second terminal of the second transistor is coupled to the other terminal of the first capacitor and the signal output terminal of the $i^{th}$ multiplexing sub-circuit, and the other terminal of the second capacitor is coupled to the second clock signal terminal of the $i^{th}$ multiplexing sub-circuit, in the $(i-1)^{th}$ time slot, under the control of the low-level first clock signal received at the first clock signal terminal, the high-level second clock signal received at the second clock signal terminal, and the high-level third clock signal received at the input terminal, the first transistor and the second transistor are turned on, the first capacitor is charged, and the low-level first clock signal received at the first clock signal terminal is output from the signal output terminal, and in the $i^{th}$ time slot, under the control of the high-level first clock signal received at the first clock signal terminal, a low-level second clock signal received at the second clock signal terminal, a low-level third clock signal received at the input terminal, the first transistor is turned off, the second transistor is turned on, and the high-level first clock signal received at the first clock signal terminal is output from the signal output terminal.

15. The touch screen according to claim 14, wherein the second control circuit comprises a third transistor and a fourth transistor, and the third transistor comprises a gate coupled to the reset terminal of the $i^{th}$ multiplexing sub-circuit, a first terminal coupled to the second terminal of the first transistor, and a second terminal coupled to the low voltage level terminal of the $i^{th}$ multiplexing sub-circuit, the fourth transistor comprises a gate coupled to the reset terminal, a first terminal coupled to the second terminal of the second transistor, and a second terminal coupled to the low voltage level terminal, in the $(i+1)^{th}$ time slot, under the control of the high-level reset signal received at the reset terminal, the third transistor and the fourth transistor are turned on, and the low-level signal received at the low voltage level terminal is output from the signal output terminal.

16. The touch screen according to claim 9, wherein the scanning circuit for a touch screen further comprises:

a clock signal controller, coupled to a first clock signal line, a second clock signal line, a third clock signal line, and a low voltage level line, respectively, the clock signal controller transmits a first clock signal, a second clock signal, a third clock signal and a low voltage level signal through the first clock signal line, the second clock signal line, the third clock signal line and the low voltage level line respectively.

17. A touch control method, which is applied to a scanning circuit for a touch screen comprising a touch panel, the touch panel comprising a plurality of emitting- electrode channels, each of which comprises a plurality of emitting touch sensing electrodes connected in series, and a plurality of receiving-electrode channels, each of which comprises a plurality of receiving touch sensing electrodes connected in series, the scanning circuit comprising: a multiplexing circuit and a touch driving circuit coupled to the multiplexing circuit, wherein the touch driving circuit comprises m signal input terminals, and each of the m signal input terminals is coupled to n receiving-electrode channels of the plurality of receiving- electrode channels, where both m and n are integers greater than or equal to 2, and the multiplexing circuit is configured to, in an $i^{th}$ time slot of a current scanning period of the touch panel, control the touch driving circuit to receive, through the m signal input terminals, output signals from m receiving-electrode channels of the plurality of receiving-electrode channels, and to determine a touch position according to the emitting-electrode channel corresponding to the current scanning period and the output signals of the m receiving-electrode channels, the touch control method comprising:

controlling the touch driving circuit to receive the output signals of the m receiving- electrode channels through the m signal input terminals in the $i^{th}$ time slot of the current scanning period of the touch panel; and determining the touch position according to the emitting-electrode channel corresponding to the current scanning period and the output signals of the m receiving-electrode channels, wherein the current scanning period comprises n time slots, i=1, 2, . . . n, and the output signals of the m receiving-electrode channels received by the touch driving circuit in each of the time slots are different, where both m and n are integers greater than or equal to 2.

\* \* \* \* \*